United States Patent [19]

Weller et al.

[11] Patent Number: 5,498,677
[45] Date of Patent: Mar. 12, 1996

[54] PROCESS FOR PREPARATION AND PURIFICATION OF MATERIAL OF A CYCLOOLEFIN COPOLYMER

[75] Inventors: Thomas Weller, Mainz; Michael-Joachim Brekner, Frankfurt; Frank Osan, Kelkheim, all of Germany

[73] Assignee: Hoechst Aktiengesellschaft, Frankfurt am Main, Germany

[21] Appl. No.: 195,076

[22] Filed: Feb. 14, 1994

[30] Foreign Application Priority Data

Feb. 12, 1993 [DE] Germany ............... 43 04 311.9

[51] Int. Cl.⁶ ............... C08F 4/649; C08F 232/04; C08F 232/08
[52] U.S. Cl. ............... 526/133; 526/134; 526/139; 526/145; 526/160; 526/281; 526/308; 528/481; 528/482; 528/491; 528/493; 528/495; 264/331.17; 264/345; 210/767; 210/769; 210/770
[58] Field of Search ............... 526/281, 308, 526/160, 133, 170, 134, 139, 145; 528/493, 495, 481, 482, 491; 210/767, 769, 770; 264/331.17

[56] References Cited

U.S. PATENT DOCUMENTS

| | | | |
|---|---|---|---|
| 4,614,778 | 9/1986 | Kajiura et al. | 526/281 |
| 4,948,856 | 8/1990 | Minchak et al. | 526/169.2 X |
| 5,087,677 | 2/1992 | Brekner et al. | 526/281 X |
| 5,324,801 | 6/1994 | Brekner et al. | 526/281 X |

FOREIGN PATENT DOCUMENTS

| | | |
|---|---|---|
| 0302424 | 2/1989 | European Pat. Off. |
| 0310680 | 4/1989 | European Pat. Off. |
| 0387016 | 9/1990 | European Pat. Off. |
| 0387018 | 9/1990 | European Pat. Off. |
| 0503422 | 9/1992 | European Pat. Off. |
| 4137427 | 1/1993 | Germany |

OTHER PUBLICATIONS

Hackh's Chemical Dictionary, 4th ed., McGraw–Hill Book Co., N.Y., 1969, 140, 199.

*Primary Examiner*—Fred Teskin
*Attorney, Agent, or Firm*—Foley & Lardner

[57] ABSTRACT

A material of a cycloolefin copolymer has a structure of alternating cycloolefin sequences, and has crystallinity in a temperature range from 210° to 320° C. The cycloolefin is prepared by polymerization of at least one polycyclic olefin, monocyclic and/or acyclic olefin with an open-chain olefin using a catalyst of a metallocene and an aluminoxane.

12 Claims, No Drawings

PROCESS FOR PREPARATION AND PURIFICATION OF MATERIAL OF A CYCLOOLEFIN COPOLYMER

BACKGROUND OF THE INVENTION

1. Field of the Invention

The invention relates to a material of a cycloolefin copolymer for extruded and injection-molded articles and to a process for its preparation.

2. Description of Related Art

For the production of recording media, such as optical information carriers, for example optical disks or compact disks, various layers of nitrides, oxides and rare earth/transition metal alloys are usually sputtered onto a prestamped substrate of polycarbonate resin, polymethyl methacrylate, epoxy resin, polysulfone, polyether-sulfone or polyether-imide. The fidelity of reproduction of the information recorded and the long-term stability of the information carrier here depends greatly on the substrate material. For example, the dimensional stability under heat and the birefringence of the substrate material influence the fidelity of reproduction decisively, while the absorption of moisture by the plastics quite considerably influences the long-term stability of the physical properties of the recording layers.

The substrates are generally produced by the injection molding technique, wherein the groove or pit matrix is transferred to the substrates of plastic by means of an original (stamper). The faithfulness of this copy to the original depends very greatly on the processability of the injection-molded material. It is known that polymeric materials which have good flow properties under processing conditions also guarantee a good image quality.

EP-A 0 310 680 describes a recording medium (MOD) in the form of a magneto-optical storage disk with a substrate of an amorphous ethylene/tetracyclododecene copolymer, which carries a magneto-optical recording layer of a quaternary amorphous rare earth/transition metal alloy of Tb, Fe and Co, with Pt or Pd as further alloying components.

A magneto-optical recording layer of Te, Ge and Cr which is sputtered onto a substrate of an amorphous copolymer of ethylene with 1,4,5,8-dimethano- 1,2,3,4,4a,5,8,8a-octahydronaphthalene, abbreviated to DMON, is known from Example 4 of EP-A 0 387 016.

Other known substrate materials are polymer alloys of polycarbonate and polystyrene and cycloolefin copolymers, such as are described in U.S. Pat. No. 4,614,778 and in EP-A 0 387 018, column 5, lines 5 to 24.

The build-up of a storage disk (OD) for which the material according to the invention is suitable as a substrate is described in German Patent 41 37 427,=U.S. Ser. No. 07/974,856.

The rotating speeds of storage disks and, associated with these, storage densities which can be achieved without loss in quality of reproduction are limited by the mechanical properties of the substrate, in particular the modulus.

Cleaning, coating and gluing of the substrate materials is limited by the specific resistance of the particular substrate material to solvents.

SUMMARY OF THE INVENTION

An object of the present invention is to provide a material for recording media which has the advantages of already known cycloolefin copolymers in respect of birefringence and absorption of water, but moreover has an increased rigidity and increased resistance to aromatic and aliphatic solvents.

Another object of the present invention is to provide a recording media having the advantages associated with such substrate material.

It is also an object of the present invention to provide a process for making and a method of using a substrate material having the above stated desired qualities.

In accordance with these objects, there has been provided a material useful for extruded and injection-molded articles, comprising a cycloolefin copolymer built up from alternating sequences of cyclic and acyclic olefins, wherein the cycloolefin copolymer has crystallinity in a temperature range from 210° C.–320° C.

In accordance with the present invention, there has also been provided a process for the preparation of a cycloolefin copolymer comprising the step of polymerization, without ring opening, of 0.1 to 100% by weight, based on the total amount of monomers, of at least one cycloolefin monomer of the formulae I, II, III, IV, V, or VI

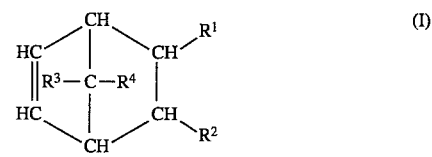

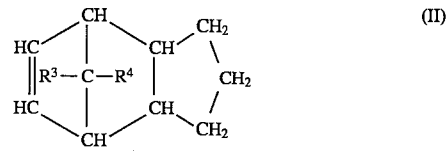

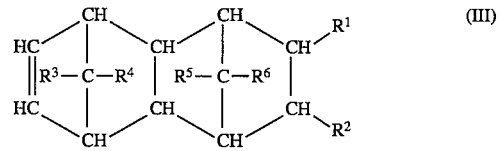

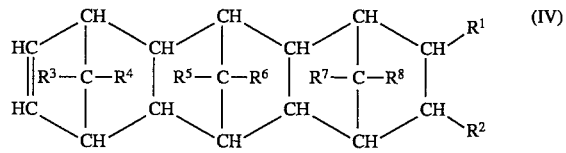

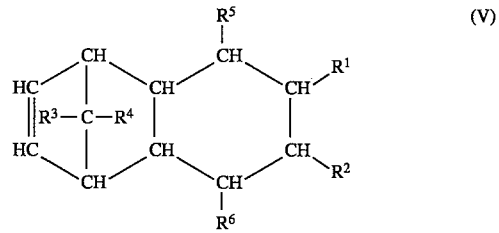

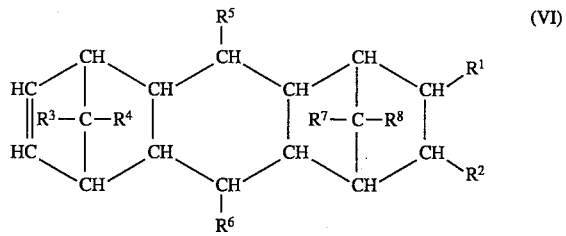

in which $R^1$, $R^2$, $R^3$, $R^4$, $R^5$, $R^6$, $R^7$ and $R^8$ are identical or different and are a hydrogen atom or a $C_1$–$C_8$-alkyl radical, it being possible for the same radicals in the various formulae to have a different meaning, 0 to 99.9% by weight, based on the total amount of monomers, of a cycloolefin of the formula VII

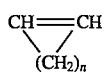 (VII)

in which n is an integer from 2 to 10, inclusive, and 0.1 to 99.9% by weight, based on the total amount of monomers, of at least one open-chain olefin at temperatures of −78° to 150° C. under a pressure of 0.01 to 64 bar in the presence of a catalyst system comprising a metallocene and one or both of an aluminoxane or a salt-like compound, in a cyclic olefin solution saturated with acyclic olefin by use of pressure, and wherein a portion of the metallocene catalyst is preactivated with aluminoxane.

Further objects, features, and advantages of the present invention will become apparent from the detailed description of preferred embodiments which follows.

DETAILED DESCRIPTION OF THE PREFERRED EMBODIMENTS

The cycloolefin copolymers of the present invention encompass polymers which have alternating sequences of units formed from cyclic and acyclic olefins and which have the desired crystallinity. The term "alternating sequences" is meant to define repeating sequences, which each comprises a cyclic unit followed by an acyclic unit. Any cyclic and acyclic olefins can be used to form the copolymers. Examples of preferred monomers are monomers (I)–(VIII) described below.

The polymers may be made by any desired process. In a preferred process, the polymers according to the invention are prepared by polymerization, without ring opening, of 0 to 99.9%, preferably 0.1 to 99.9% by weight, based on the total amount of monomers, of at least one monomer of the formula I, II, III, IV, V or VI

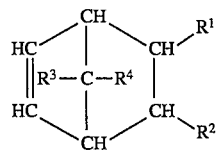 (I)

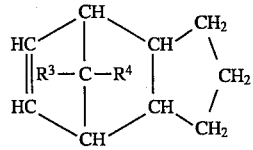 (II)

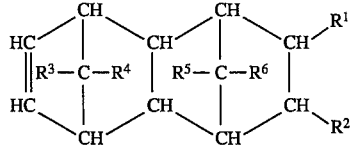 (III)

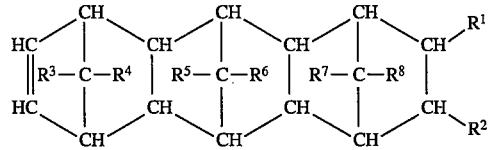 (IV)

-continued

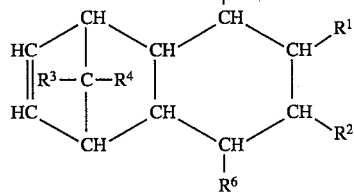 (V)

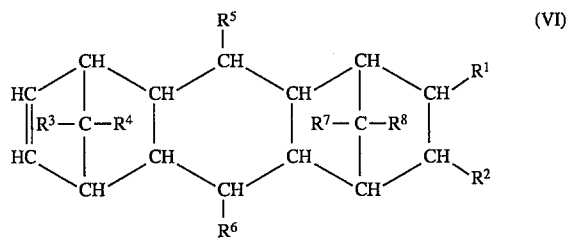 (VI)

in which $R^1$, $R^2$, $R^3$, $R^4$, $R^5$, $R^6$, $R^7$ and $R^8$ are identical or different and are a hydrogen atom or a $C_6$–$C_{16}$-aryl or a $C_1$–$C_8$-alkyl radical, it being possible for the same radicals in the various formulae to have a different meaning, 0 to 99.9% by weight, based on the total amount of monomers, of a cycloolefin of the formula VII

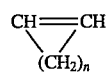 (VII)

in which n is an integer number from 2 to 10, inclusive, and 0.1 to 99.9% by weight, based on the total amount of monomers, of one or more open-chain olefins, preferably an acyclic olefin of the formula VIII

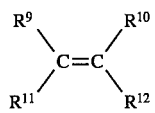 (VIII)

in which $R^9$, $R^{10}$, $R^{11}$ and $R^{12}$ are identical or different and are a hydrogen atom or a $C_1$–$C_8$-alkyl radical, at preferred temperatures of −78° to 150° C., −20° to 140° C. or 0° to 120° C., under a preferred pressure of 0.01 to 64 bar, 0.1 to 45 bar or 0.5 to 30 bar, respectively, in the presence of a catalyst system comprising a metallocene and one or more of an aluminoxane or a salt-like compound selected from the group including borates and boranes, such as triphenylcarbeniumtetrakis(pentafluorophenyl)borate or tris(pentafluorophenyl)borane. The salt-like compound can be used instead of the aluminoxane. In this case, the metallocene is preactivated with the salt-like compound, as will be described later in respect of the preactivation of the metallocene with aluminoxane.

The process comprises polymerizing at least one cycloolefin of the formula I, II, III, IV, V, VI or VII and at least one open-chain olefin which is preferably an acyclic 1-olefin of the formula VIII. The reaction is generally performed in a solution of the cyclic olefin, wherein the catalyst is generally in the form of a solution and generally a portion of the metallocene is preactivated with the aluminoxane for use in the polymerization reaction. Preactivation means that the metallocene is dissolved or brought into contact with the methyl-aluminoxane (MAO) solution, the solvent usually being toluene, before feeding this mixture to the polymerization autoclave. Preactivation of the catalyst is performed for 15 to 30 minutes in an ultrasound bath.

The composition of the catalyst system, which comprises an aluminoxane and a metallocene, is described and claimed in EP-A-0,503,422=U.S. Ser. No. 08/131,945. This European Patent Application is incorporated by reference in its entirety.

The cycloolefin polymer can be isolated from the reaction mixture in any desired manner. For example, the cycloolefin polymer may be precipitated or suspended in a liquid of a ketone, alcohol or ester, for example, by pouring the polymer into the liquid and then filtered off. The filtered polymer is then washed, dissolved and filtered off again and dried, and the dried polymer is pressed to sheets thermoplastically, for example, at a temperature between 280° C. and 320° C., preferably at a temperature of 300° C.

In one embodiment of the invention, (VIII) is ethylene, and the cycloolefin to ethylene incorporation ratio is adjusted to a value of 40 to 60 mol % of cycloolefin to 60 to 40 mol % of ethylene.

In another embodiment of the invention, (VIII) is ethylene and the cycloolefin is norbornene, and the incorporation ratio is 50 mol % of norbornene to 50 mol % of ethylene.

In a further manner of isolating the polymer, the cycloolefin polymer is precipitated in a liquid of a ketone, alcohol or ester and filtered off, diatomaceous earth is added to the filter cake, in Decalin (decahydronaphthalene) and the mixture is heated and dissolved, the suspension is filtered and precipitated by pouring into a ketone and the precipitate is filtered, and the polymer is then washed and dried.

In the isolation process, the diatomaceous earth may be added with water to the cycloolefin polymer, the mixture is heated and dissolved and the precipitate is filtered off, and the filtered solution is precipitated by pouring into ketone and the polymer is washed and dried.

The monocyclic olefin VII can also be substituted, for example by aryl or alkyl radicals. For the purposes of the invention cyclopentene is a preferred monocyclic olefin, but cycloheptene, indene and cyclooctane can likewise be copolymerized and are suitable.

The polymerization is preferably carried out in the liquid cycloolefin monomer, in a mixture of cycloolefin monomers or in concentrated solutions.

At least one polycyclic olefin of the formulae I, II, III, IV, V or VI, preferably a cycloolefin of the formulae I or III, is thereby polymerized in the process according to the invention.

If appropriate, a monocyclic olefin of the formula VII, is used either in combination with a polycyclic olefin or in place of the polycyclic olefin. An essential comonomer is an open-chain olefin, which is preferably an acyclic olefin of the formula VIII. Ethylene or propylene are preferred acyclic olefins.

Copolymers of polycyclic olefins, preferably of the formulae I and II, with the acyclic olefins VIII are particularly preferred.

Particularly preferred cycloolefins include norbornene and tetracyclododecene, it being possible for these to be substituted by ($C_1$–$C_6$)-alkyl. They are preferably copolymerized with ethylene. Ethylene/norbornene copolymers are of particular importance.

The incorporation ratios of comonomers VII to the polycyclic olefin, and/or VIII to the polycyclic olefins in the copolymer are generally in the range from 20:80 to 80:20. Incorporation ratios of 40:60 to 60:40 are particularly preferred.

The concentration of the open-chain olefin in the copolymer results from the solubility of the open-chain olefin in the reaction medium under the given pressure and at the given temperature.

Polycyclic olefins, monocyclic olefins and open-chain olefins are also to be understood to include mixtures of two or more olefins of the particular type. In other words, in addition to polycyclic bi-copolymers, ter- and multi-copolymers can also be prepared by the process according to the invention. Copolymers of the cycloolefins VII with the acyclic olefins VIII can also advantageously be obtained by the process described. Of the cycloolefins VII, cyclopentene, which can be substituted, is preferred.

The aluminoxane can be prepared in various ways by known processes. One of the methods is, for example, to react an aluminum-hydrocarbon compound and/or a hydridoaluminum-hydrocarbon compound with water (gaseous, solid, liquid or bonded, for example as water of crystallization) in an inert solvent, such as, for example, toluene. To prepare an aluminoxane with different alkyl groups $R^{13}$, two different aluminum trialkyls ($AlR_3+AlR'_3$) are reacted with water according to the desired composition See S. Pasynkiewicz, Polyhedron 9 (1990) 429 and EP-A 0 302 424, which are both hereby incorporated by reference.

Regardless of the nature of their preparation, all the aluminoxane solutions have the common feature of a varying content of unreacted aluminum starting compound, which is present in the free form or as an adduct.

In an embodiment of the process, it is possible for the metallocene to be preactivated with an aluminoxane before use in the polymerization reaction. The polymerization activity is increased significantly by this procedure.

The preactivation of the transition metal compound is generally carried out in solution. Preferably, the metallocene is dissolved here in a solution of the aluminoxane in an inert hydrocarbon. An aliphatic or aromatic hydrocarbon is a suitable inert hydrocarbon. Toluene is preferably used here.

The concentration of the aluminoxane in the solution is generally in the range from about 1% by weight up to the saturation limit, preferably from 5 to 30% by weight, in each case based on the total solution. The metallocene can be employed in the same concentration, but it is employed in particular in an amount of $10^{-4}$ to 1 mol per mole of aluminoxane. The preactivation generally takes 5 minutes to 60 hours, preferably 5 to 60 minutes. The temperature range during the preactivation generally extends from −78° to 150° C., preferably between 0° and 70° C.

The metallocene can also be prepolymerized or applied to a support. The olefin or one of the olefins employed in the polymerization is preferably used for the prepolymerization.

Suitable supports are, for example, silica gels, aluminum oxides, solid aluminoxane or other inorganic support materials. A polyolefin powder in finely divided form is also a suitable support material.

Another possible embodiment of the process according to the invention comprises using a salt-like compound of the formula $R_xNH_{4-x}BR'_4$ or of the formula $R_3PHBR'_4$ as a cocatalyst, instead of or in addition to an aluminoxane. In these formulae, x=1, 2 or 3, R=identical or different alkyl or aryl and R'=aryl, which can also be fluorinated or partly fluorinated. In this case, the catalyst comprises the reaction product of a metallocene with one of the compounds mentioned, as is described in the document EP-A 0 277 004, which is hereby incorporated by reference.

If a solvent is added to the reaction mixture, it is a customary inert solvent, such as, for example, aliphatic or cycloaliphatic hydrocarbons, gasoline or hydrogenated diesel oil fractions or toluene.

The metallocene compound is generally used in a concentration, based on the transition metal, of $10^{-3}$ to $10^{-8}$, preferably $10^{-4}$ to $10^{-7}$ mol of transition metal per dm³ of reactor volume. The aluminoxane is generally used in a concentration of $10^{-4}$ to $10^{-1}$, preferably $10^{-4}$ to $2\times10^{-2}$ mol per dm³ of reactor volume, based on the content of aluminum. However, higher concentrations are in principle also possible.

The molar ratios of the polycyclic olefin to the open-chain olefin employed in the preparation of copolymers can be varied within a wide range. Thus, molar ratios of 3:1 to 100:1 of cycloolefin to open-chain olefin may be used. The incorporation rate of comonomer can be largely controlled by the choice of polymerization temperature and by the concentration of catalyst components and the molar ratio employed or the pressure of the gaseous open-chain olefin. The incorporation rates are generally between 20 and 80 mol % of the cyclic components and, in particular, are 40 to 60 mol % of the cyclic components.

The average molecular weight of the copolymer formed can be controlled in a known manner by hydrogen metering, varying the catalyst concentration or varying the temperature. Preferred molecular weights are 10000–200000 g/mole, 20000–150000 g/mole and 25000–100000 g/mole. The molecular weights are determined by means of size exclusion chromatography, polystyrene standard in o-dichlorobenzene, at 135° C. To decrease the molecular weight of the polymers, a carefully metered stream of hydrogen, together with ethylene, is continuously fed into the reaction vessel, whereby hydrogen acts as a chain terminating agent.

The polydispersity $M_w/M_n$ of the copolymers is quite narrow, with values usually of between 2.0 and 3.5. This results in a property profile of the polymers which renders them particularly suitable for injection molding and extrusion.

The copolymers generally have a glass transition temperature of 126° C. to 135° C. and a melting point of 277° C. to 286° C.

With the aid of NMR spectra (nuclear magnetic resonance spectra), it has been found that these cyclolefin copolymers differ significantly in their microstructure from those prepared using conventional metallocene catalysts. This difference can be explained by the fact that the catalysts polymerize alternately because of their special symmetry. The cycloolefin copolymers according to the invention comprise alternating cycloolefin sequences which allow the structure to be differentiated on the basis of the nuclear magnetic resonance measurement.

The materials prepared according to the invention are particularly suitable for the production of extruded components, such as films, tubes, pipes, rods and fibers, and also for the production of injection-molded articles of any desired shape and size, in particular disk substrates for magneto-optical storage media.

An important property of the materials according to the invention is their transparency. Optical uses of the extruded or injection-molded components of these materials are therefore of particular importance. The refractive index, determined using an Abbé refractometer and mixed light, of the copolymer, described in the examples which follow is in the range from 1.520 to 1.555. Since the refractive index is very close to that of crown glass (n=1.51), the products according to the invention can find various uses as a substitute for glass, for example, as lenses, prisms and carrier disks and films for optical data stores, for video disks and for compact disks, as covering and focusing screens for solar cells, as covering and scattering screens for optical systems of high optical efficiency, as lightwave conductors in the form of fibers or films, and other such uses.

The copolymers generally have a viscosity ($\eta$) for a frequency of 5/s at a temperature of 300° C. of less than or equal to $6 \times 10^3$ Pa.S. Also, the copolymers generally have a viscosity $\eta$ for a frequency 500/s of less than or equal to $3 \times 10^2$ Pa.S.

The transparent, partly crystalline cycloolefin copolymers according to the invention, like other cycloolefin copolymers, have a very low anisotropy of molecular polarizability, which leads to a low birefringence of the materials; they have a low absorption of moisture and can readily be processed by means of injection molding techniques above the melting point. In this context, "partly crystalline" means that crystallinity ranges from 1 to 80%, 5 to 50%, 10 to 30%. According to the invention, the cycloolefin copolymers are particularly suitable as a substrate material for the production of optical recording media, such as optical disks and compact disks.

The copolymers of the present invention are especially useful in substrates of recording media. A magneto-optical storage disk comprises a recording medium provided with an additional coating of each of the two sides. The two coatings are hardened with the aid of ultraviolet radiation. The coating on the recording medium carrier which is transparent to laser light serves in particular to increase the scratch resistance and reduces accumulation of dust on the storage disk during operation of the disk, which results in a higher reliability of the reproduction of data from the recording medium. The other coating serves above all as mechanical protection for the recording medium, which generally comprises at least a four-layer structure applied to the carrier in layer form.

The four-layer structure on the carrier comprises, for example, a lower dielectric layer, a magneto-optical recording layer, an upper dielectric layer and a reflective layer. It is also possible for the reflective layer and the upper dielectric layer to be interchanged, so that the reflective layer lies directly on the magneto-optical recording layer.

EXAMPLES

The glass transition temperatures $T_g$ stated in the following examples were determined by means of DSC (differential scanning calorimetry) at a heating-up rate of 20° C./minute. For this purpose, the thermal analyses were carried out with a Perkin-Elmer $DSC_7$ apparatus, the second heating curve being used. The viscosity numbers stated were determined in accordance with DIN 53 728.

EXAMPLE 1

A 1.5 dm³ polymerization reactor was filled with ethylene, and 600 cm³ of an 85 percent strength by weight solution of norbornene in toluene was introduced. The solution was saturated with ethylene by forcing in ethylene (6 bar) several times. A pressure of 2 bar of ethylene was established, 5 cm³ of a toluene solution of methylaluminoxane (10.1% by weight of methylaluminoxane of molecular weight 1300 g/mol, according to cryoscopic determination) were introduced into the reactor and the mixture was stirred at 40° C. for 15 minutes. After preactivation for 15 minutes, a solution of 5 mg of isopropylene-(9-fluoroenyl) (1-( 3-methyl)-cyclopentadienyl)zirconium dichloride in 5 cm³ of a toluene solution of methylaluminoxane was added. Hydrogen can be metered in before addition of the catalyst for regulation of the molecular weight.

Polymerization was carried out at 40° C. for one hour, while stirring (750 revolutions per minute), the excess ethylene pressure being kept at 2 bar by topping up.

The reaction solution was drained into a vessel and poured rapidly into 5 cm³ of acetone, and the mixture was stirred for 10 minutes and then filtered.

The resulting solid was washed several times with 10% strength hydrochloric acid and acetone in alternation. It was washed neutral, stirred again with acetone and filtered off. The polymer was filtered again and dried at 80° C. under a pressure of 0.2 bar for 15 hours.

54 g of a colorless polymer were obtained. A viscosity number VN of 131 ml/g, a glass transition temperature $T_g$ of 133° C. and a melting point $T_m$ of 286° C. were measured. According to the NMR spectrum, the norbornene/ethylene incorporation ratio is about 50 mol % of norbornene to 50 mol % of ethylene.

EXAMPLE 2

A 1.5 dm³ polymerization reactor was filled with ethylene, and 600 cm³ of an 85 percent strength by weight solution of norbornene in toluene were introduced. The solution was saturated with ethylene by forcing in ethylene (6 bar) several times. An excess pressure of 4.5 bar of ethylene was established, 5 cm³ of a toluene solution of methylaluminoxane (10.1% by weight of methylaluminoxane of molecular weight 1300 g/mol, according to cryoscopic determination) were added to the reactor and the mixture was stirred at 70° C. for 15 minutes. After preactivation for 15 minutes, a solution of 2 mg of isopropylene-(9-fluorenyl)(1-(3-methyl)-cyclopentadienyl)zirconium dichloride in 5 cm³ of a toluene solution of methylaluminoxane was added. Hydrogen can again be metered in before addition of the catalyst for regulation of the molecular weight.

Polymerization was carried out at 70° C. for one hour, while stirring (750 revolutions per minute), the excess ethylene pressure being kept at 4.5 bar by topping up.

The reaction solution was drained into a vessel and poured rapidly into 5 dm³ of acetone, and the mixture was stirred for 10 minutes and then filtered.

The filter cake was introduced into 1 liter of Decalin (decahydronaphthalene), 10 g of diatomaceous earth (Celite) were added to the mixture and the mixture was heated at 180° C. for 1 hour, while stirring, during which the polymer dissolved. The suspension was filtered at 180° C. under increased pressure and the clear polymer solution obtained was poured hot into acetone. The precipitated product was filtered off and washed three times with acetone. The still moist powder was then dried at 160° C. under 0.1 bar in a drying cabinet.

The yield was 65 g of colorless, pulverulent polymer having a glass transition temperature $T_g$ of 126° C., a melting point $T_m$ of 277° C. and a viscosity number VN of 96 ml/g.

EXAMPLE 3

A 75 dm³ polymerization reactor was filled with ethylene, and 15 dm³ of norbornene and 15 dm³ of Decalin (decahydronaphthalene) were introduced. The solution was saturated with ethylene by forcing in ethylene (6 bar) several times. An excess pressure of 2.5 bar of ethylene was established, 500 cm³ of a toluene solution of methylaluminoxane (10.1% by weight of methylaluminoxane of molecular weight 1300 g/mol, according to cryoscopic determination) were added to the reactor and the mixture was stirred at 70° C. for 15 minutes. After preactivation for 15 minutes, a solution of 150 mg of isopropylene-(9-fluorenyl)-(1-(3-methyl)-cyclopentadienyl)zirconium dichloride in 500 cm³ of a toluene solution of methylaluminoxane was added. Hydrogen can again be metered in before addition of the catalyst for regulation of the molecular weight.

Polymerization was carried out at 70° C. for one hour, while stirring (750 revolutions per minute), the excess ethylene pressure being kept at 2.5 bar by topping up.

The suspension was drained into a 150 dm³ tank and 500 g of Celite and 200 ml of water were added. The suspension was heated to 170° C., during which the polymer dissolved. The mixture was then filtered over a 120 dm³ pressure filter. Deep-bed filters down to 0.3 μm pore width can be employed for optimum purification of the solution.

The solution was precipitated in 500 dm³ of acetone and the precipitate was washed several times with acetone. The polymeric product was dried at 100° C. under 0.1 bar for 15 hours.

The yield was 1400 g of colorless, pulverulent polymer having a glass transition temperature $T_g$ of 126° C., a melting point $T_m$ of 284° C. and a viscosity number VN of 59 ml/g.

EXAMPLE 4

Circular pressed sheets having a diameter of 25 mm were produced from the materials according to Examples 1, 2 and 3 by pressing at 300° C. for 15 minutes. The colorless and transparent pressed sheets were used for determination of the melt viscosity, it being assumed that the processability of the materials correlates with the viscosity. The measurements were carried out in "pane-pane" geometry at 300° C. at two frequencies and the measurement values have been summarized in Table 1. The apparatus used for this was a "Rheometric Dynamic Spectrometer RDS2".

TABLE 1

| Example | VN (ml/g) | $T_g$ (°C.) | $T_m$ (°C.) | Frequency 1 $n$(5/s) (Pa · s) | Frequency 2 $n$(500/s) (Pa · s) |
|---|---|---|---|---|---|
| 1 | 113 | 135 | 286 | 6000 | 300 |
| 2 | 96 | 126 | 277 | 1500 | 100 |
| 3 | 59 | 126 | 284 | 50 | 45 |

Production of test specimens

Polymers prepared according to Example 1 were shaped to sheets by pressing at 300° C. under a pressure of 10 bar for 15 minutes. The sheets were subsequently cooled to 100° C. at a cooling rate of 20° C./minute under a pressure of 10 bar and then removed from the press. The circular sheets thus obtained had a diameter of 60 mm at a thickness of 1 mm.

Investigation of the resistance to solvents

The weight M1 of the test specimens or pressed sheets was determined and the products were then stored in toluene, cyclohexane, hexane, chloroform and methylene chloride at room temperature for 24 hours. Thereafter, the sheets were washed by dipping briefly in pentane. Adhering solvent evaporated within a few seconds. By renewed determination of the weight M2, at the latest 3 minutes after the pentane wash, and obtaining the difference (M2−M1), the percentage change in weight ΔM was determined, given by the equation $$\Delta M (\%) = \frac{(M2-M1)}{(M1)} \cdot 100$$
$$= (M2/M1 - 1) \cdot 100$$

The changes in weight for the various solvents are summarized in Table 2.

TABLE 2

| Solvent | ΔM (%) |
|---|---|
| Toluene | +0.1 |
| Cyclohexane | <0.1 |
| Hexane | <0.1 |
| Methylene chloride | +0.8 |
| Chloroform | +1.1 |

What is claimed is:

1. A process for the preparation of a cycloolefin copolymer comprising the step of polymerization, without ring opening, of 0.1 to 100% by weight, based on the total amount of monomers, of at least one cycloolefin monomer of the formulae I, II, III, IV, V, or VI

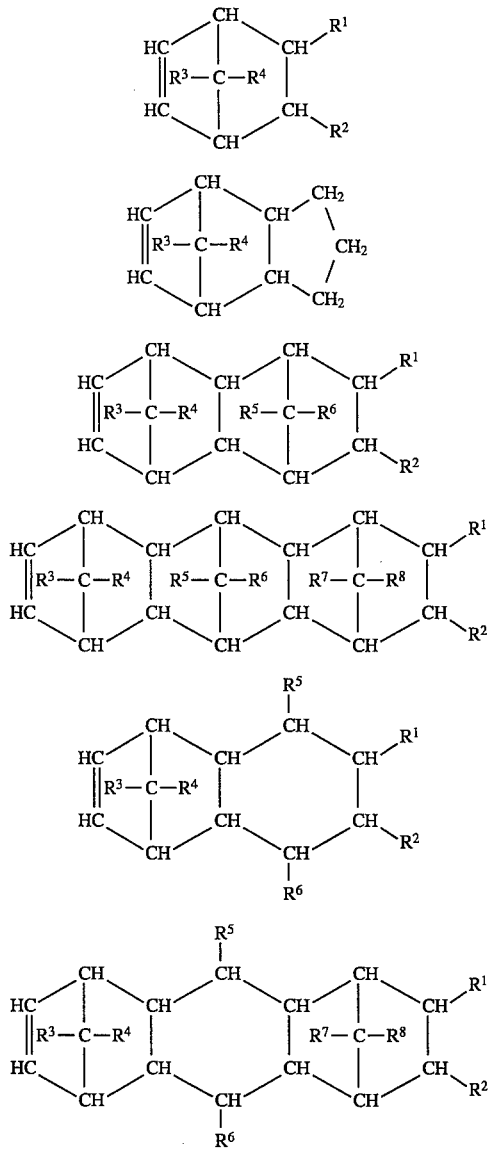

in which $R^1$, $R^2$, $R^3$, $R^4$, $R^5$, $R^6$, $R^7$ and $R^8$ are identical or different and are a hydrogen atom or a $C_1$-$C_8$-alkyl radical, it being possible for the same radicals in the various formulae to have a different meaning, 0 to 99.9% by weight, based on the total amount of monomers, of a cycloolefin of the formula VII

in which n is an integer from 2 to 10, inclusive, and 0.1 to 99.9% by weight, based on the total amount of monomers, of at least one open-chain olefin at temperatures of −78° to 150° C. under a pressure of 0.01 to 64 bar in the presence of a catalyst system comprising a metallocene and one or both of an aluminoxane or salt-like compound, wherein a portion of the metallocene catalyst is preactivated with a salt-like compound, in a cyclic olefin solution saturated with acyclic olefin by use of pressure, thereby forming a reaction solution comprising said cycloolefin copolymer and wherein the reaction solution is purified by a process comprising pouring the reaction solution into a liquid of a ketone, alcohol or ester, filtering the resulting mixture to give a filter cake, mixing the filter cake with decahydronaphthalene and diatomaceous earth to form a suspension, heating the suspension to dissolve said cycloolefin polymer, and filtering the resulting solution over a pressure filter with down to 0.3 μm pore width to give a clear solution of said cycloolefin polymer.

2. A process as claimed in claim 1, further comprising adding said clear solution of said cycloolefin polymer to a liquid of a ketone, alcohol or ester, thereby precipitating said cycloolefin copolymer, filtering, washing and drying said cycloolefin copolymer, and pressing said cycloolefin copolymer into sheets thermoplastically at a temperature of 300° C.

3. A process as claimed in claim 1, wherein the open-chain olefin comprises ethylene, and the cycloolefin ethylene incorporation ratio is adjusted to a value of 40 to 60 mol % of cycloolefin to 60 to 40 mol % of ethylene.

4. A process as claimed in claim 2, wherein the open-chain olefin comprises ethylene and the cycloolefin comprises norbornene, and the incorporation ratio is 50 mol % of norbornene to 50 mol % of ethylene.

5. A process as claimed in claim 1, wherein the catalyst system comprises metallocene dissolved in a solution of the aluminoxane in an aliphatic or aromatic hydrocarbon.

6. A process as claimed in claim 5, wherein the concentration of the aluminoxane in the solution is from 1% by weight up to the saturation limit.

7. A process as claimed in claim 6, wherein the metallocene is dissolved in an amount of $10^{-4}$ to 1 mol per mole of aluminoxane.

8. A process as claimed in claim 1, wherein a salt-like compound of the formula

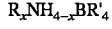

where x=1, 2 or 3, R=identical or different alkyl or aryl and R'=fluorinated or partly fluorinated aryl, is employed as a further catalyst in addition to the aluminoxane or instead of the aluminoxane.

9. A process as claimed in claim 1, wherein a salt-like compound of the formula $$R_3PHBR'_4$$

where R=identical or different alkyl or aryl and R'=aryl, which is completely fluorinated or partly fluorinated, is employed as a further catalyst in addition to the aluminoxane or instead of the aluminoxane.

10. A process as claimed in claim 1, wherein the open-chain olefin comprises an acyclic 1-olefin of the formula VIII

in which $R^9$, $R^{10}$, $R^{11}$ and $R^{12}$ are identical or different and are a hydrogen atom or a $C_1$–$C_8$-alkyl radical.

11. A method of purifying a reaction solution comprising a cycloolefin copolymer comprising repeating sequences, wherein each of said sequences comprises a cyclic olefin unit followed by an acyclic olefin unit, comprising pouring the reaction solution into a liquid of a ketone, alcohol or ester, filtering the resulting mixture to give a filter cake, mixing the filter cake with decahydronaphthalene and diatomaceous earth to form a suspension, heating the suspension to dissolve said cycloolefin polymer, and filtering the resulting solution over a pressure filter with down to 0.3 μm pore width to give a clear solution of said cycloolefin polymer.

12. A process as claimed in claim 11, further comprising adding said clear solution of said cycloolefin polymer to a liquid of a ketone, alcohol or ester, thereby precipitating said cycloolefin copolymer, and filtering, washing and drying said cycloolefin copolymer.

* * * * *